July 2, 1946.   O. ZANCAN   2,403,162
SHIFT LEVER FOR TRANSMISSIONS
Filed Feb. 6, 1945   2 Sheets-Sheet 1
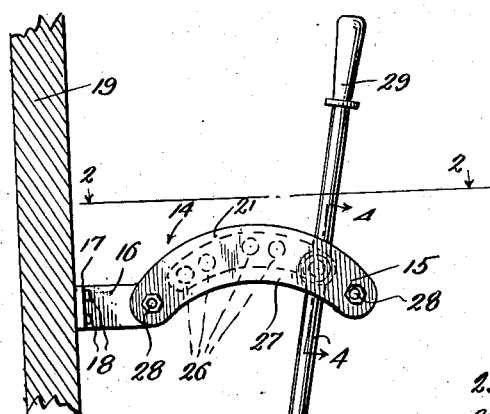
Fig. 1.
Fig. 4.
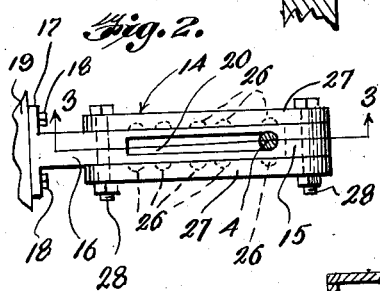
Fig. 2.
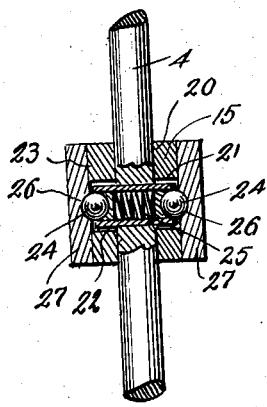
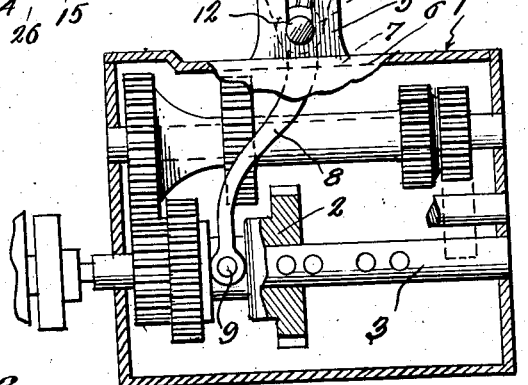
Fig. 3.
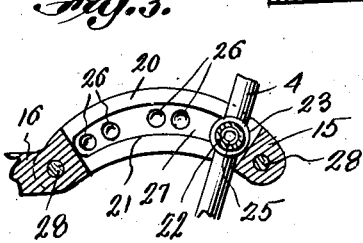
Inventor
OTTAVIO ZANCAN

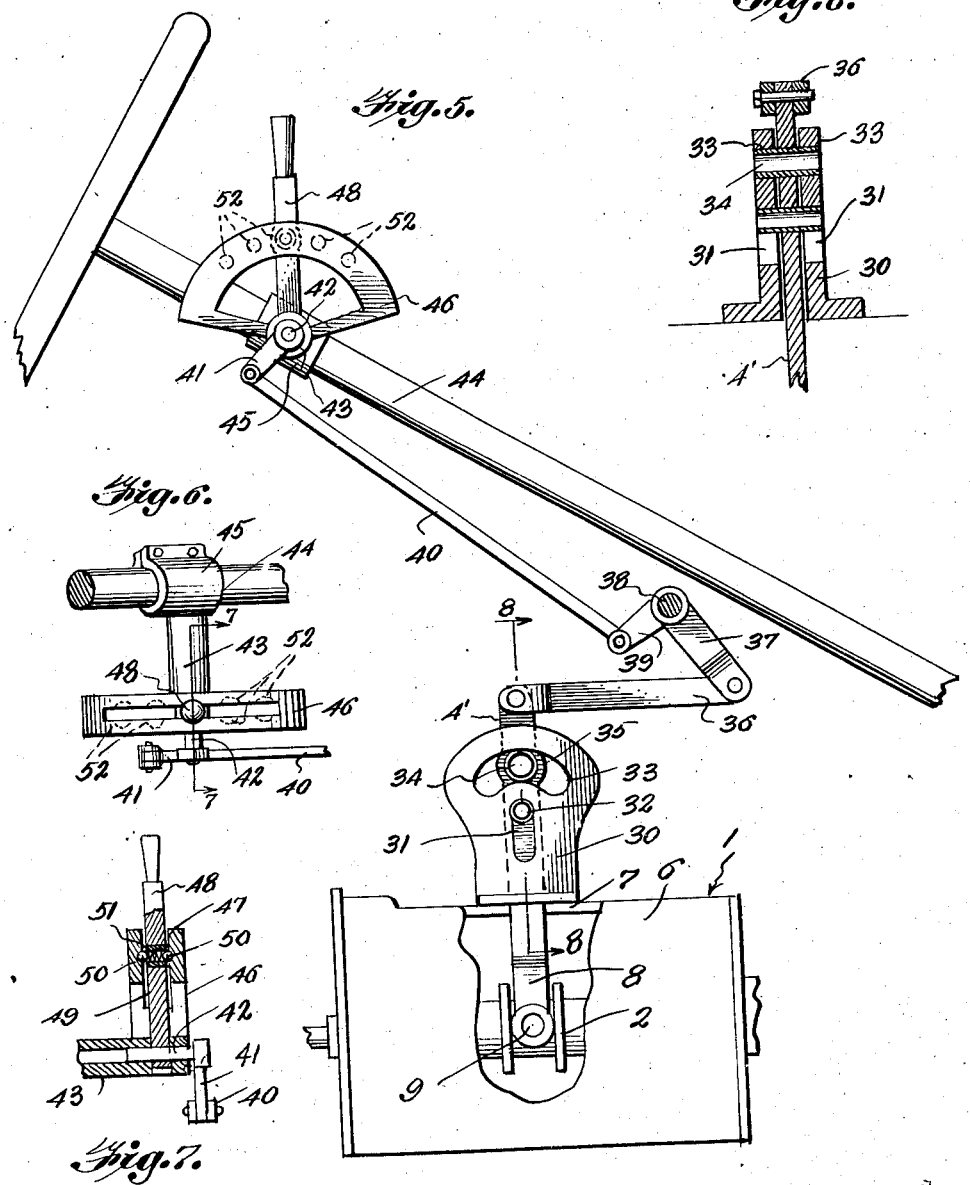

Patented July 2, 1946

2,403,162

UNITED STATES PATENT OFFICE 2,403,162

SHIFT LEVER FOR TRANSMISSIONS

Ottavio Zancan, New York, N. Y.

Application February 6, 1945, Serial No. 576,469

3 Claims. (Cl. 74—473)

1

This invention relates to a shift lever for a transmission and it is one object of the invention to provide a lever so formed and so mounted that by simply tilting the lever forwardly or rearwardly the transmission may be adjusted for desired forward speeds or in reverse.

Another object of the invention is to provide a lever so mounted that when it is swung forwardly or rearwardly the pivot pin about which it moves as a fulcrum may shift vertically and thus prevent binding which would prevent such movement about a stationary fulcrum.

Another object of the invention is to provide a lever having a rack associated therewith for releasably holding the lever in adjusted position but permitting the lever to be readily moved to shift the gears of a transmission when so desired.

Another object of the invention is to provide a lever which may be directly grasped for operation or connected with auxiliary operating mechanism including a lever mounted upon the steering post of a vehicle in cooperating relation to a rack.

Another object is to provide a lever which is simple in construction, very strong, and not liable to break or become jammed when in use.

In the accompanying drawings:

Fig. 1 is a view partially in section and partially in elevation showing the improved lever mounted for use.

Fig. 2 is a view on the line 2—2 of Fig. 1.

Fig. 3 is a sectional view on the line 3—3 of Fig. 2.

Fig. 4 is a sectional view on an enlarged scale on the line 4—4 of Fig. 1.

Fig. 5 is a side elevation showing a modified embodiment of the invention.

Fig. 6 is a fragmentary perspective view showing the rack carried by the steering post of Fig. 5 and the lever associated therewith.

Fig. 7 is a sectional view on the line 7—7 of Fig. 6.

Fig. 8 is a sectional view on the line 8—8 of Fig. 5.

The transmission shown in Fig. 1, and indicated in general by the numeral 1, is of conventional form and includes the usual shafts carrying gears, the compound gear 2 of shaft 3 being slidable along the same for selective meshing engagement with other gears of the transmission to impart controlled forward movement to a vehicle or rearward movement thereto. Since the transmission has a conventional arrangement of shafts and gears it is not necessary to specifically describe the same.

2

The lever 4, by means of which the compound gear 2 is shifted along shaft 3, is disposed vertically through a slotted block 5 carried by and projecting upwardly from the casing 6 of the transmission midway the length thereof. This lever is formed of strong metal and its lower end portion, which enters the casing 6 through the slot 7, terminates in forks 8 which straddle the compound gear 2 and are pivotally connected therewith so that when the lever is swung about its fulcrum, the gear will be shifted longitudinally along the shaft 3 and selectively moved into mesh with the companion gears of the transmission. The forks 8 of the lever 4 are engaged about trunnions 9 and since the trunnions are carried by a conventional sleeve or collar which fits loosely about the neck of gear 2 the gear may be shifted longitudinally upon the shaft 3 and also turn with the shaft.

The portion of the lever passing through the vertical slot or passage 10 of the block 5, is formed with a bearing 11 through which passes a fulcrum pin 12, and this pin has its end portions engaged through vertical slots 13 formed in opposite side walls of the block 5. Since the fulcrum pin passes through vertical slots, it may shift vertically when the lever is tilted about the pin to shift the gear 2 along the shaft 3 and binding action will not occur and prevent movement of the lever and the gear. It will also be noted that by so mounting the lever, it may shift the compound gear merely by having forward and rearward swinging movement imparted thereto and that no transverse movement is necessary to cause a vehicle to move forwardly at the desired speed or throwing the transmission into reverse and causing the vehicle to move rearwardly.

In order to releasably hold the lever in adjusted position, there has been provided a rack 14 consisting of a bar 15 which is arcuate longitudinally and provided at one end with a shank 16 terminating in a cross head 17 through which fasteners 18 are passed to firmly mount the rack against a support 19 which may be the instrument board or any other convenient portion of a vehicle body. A longitudinally extending slot 20 is formed vertically through the bar 15 to receive the lever 4 and, at opposite sides of the slot 20, the bar is formed with slots 21 for receiving end portions of a tube 22 which passes through the enlargement 23 of the lever. This tube constitutes a jacket of a latch and within the tube are latching balls 24 urged outwardly by a spring 25 so that, as the lever is swung longitudinally of the slot 20, the latching balls will be urged into seats 26 formed in the inner side faces of plates 27 disposed against opposite side faces of the bar 15 and secured by bolts 28. The curvature of the bar 15 and its slots is such that when the lever is swung forwardly or rearwardly to move the compound gear to adjusted positions and the fulcrum pin 12 moves vertically in the slots 13, the latching balls 24 will successively move from one set of depressions or seats 25 to another and firmly, but releasably, hold the lever in an adjusted position. It will thus be seen that, by grasping the hand hold 29 and exerting pull or push, the gears may be shifted and that side movement of the lever is not necessary.

In Figs. 5 through 8, there has been illustrated a modified embodiment of the invention. In this embodiment, the lever 4' is foreshortened and the block 30, corresponding to the block 5, is of greater height and formed with opposed vertical slots 31 to receive the fulcrum pin 32 of the lever and with opposed, horizontally extending arcuate slots 33 to receive the end portions of a pin 34 which passes through an enlargement 35 of the lever. The curvature of the slots 33 is such that, as the lever is shifted vertically during its swinging or tilting movement, the pin 34 will follow the slots. The upper end of the lever is pivoted to a link 36 which extends forwardly therefrom and, at its front end, is pivoted to an arm 37 carried by and extending downwardly from a shaft 38 which is rotatably mounted transversely of the vehicle. This shaft also carries an arm 39 extending downwardly from the shaft at a rearward incline and pivoted to the lower end of a rod 40 having its upper end pivoted to an arm 41 carried by a shaft 42. This shaft 42 is rotatably mounted in a bearing sleeve 43 secured to the steering post 44 by a clamp 45 and carrying a rack 46. The rack corresponds to the rack 14 and is formed with a longitudinal slot 47 to accommodate a lever 48 carried by the shaft 42. A tube 49 is mounted through the lever 48 and in the tube are mounted latching balls 50 pressed outwardly by a spring 51 for engaging in the recesses or seats 52 of the rack and releasably holding the lever in adjusted position. When the lever is swung about its pivot, the shaft 38 is rocked and pull or push exerted upon the link 36 to move the lever 4' and effect shifting of the compound gear 2 of the transmission to vary forward speed or reverse for rearward movement of the vehicle.

The drawings illustrate a practical embodiment of the invention but since modification may be developed in commercial exploitation of the invention it is to be understood that I reserve the right to make changes in construction and arrangement of parts which come within the scope of the appended claims.

What is claimed is:

1. In a transmission including a casing and gearing in the casing having a gear shiftable along a shaft; a lever for moving the shiftable gear along its shaft to adjusted positions extending into said casing and having its inner end pivoted to said gear, a block extending outwardly from said casing and formed with a passage through which said lever passes, the block being formed with slots at opposite sides of the passage extending radially of the gear and the shaft, and a fulcrum pin for said lever passing transversely through the lever with end portions projecting from opposite sides of the lever and slidably engaged in the slots whereby the pin may have longitudinal movement radially of the shaft and the gear as the lever is tilted to move the gear along the shaft.

2. In a transmission including a casing and gearing in the casing having a gear shiftable along a shaft; a lever for moving the shiftable gear along its shaft to adjusted positions extending into said casing and having its inner end pivoted to said gear, a block extending outwardly from said casing and formed with a passage through which said lever passes, the block being formed with slots at opposite sides of the passage extending radially of the gear and the shaft, a fulcrum pin for said lever passing through the lever with end portions projecting from opposite sides thereof and slidably engaged in said slots whereby the pin may move radially of the gear and the shaft as the lever is swung to move the gear along the shaft, a rack formed with a longitudinally extending slot through which said lever passes and having seats arranged in an arcuate path and spaced from each other longitudinally of the rack, and a latch carried by said lever within the bracket in position for engaging in the seats as the lever is moved to adjusted positions.

3. In a transmission including a casing and gearing in the casing having a gear shiftable along a shaft; a lever for moving the shiftable gear along its shaft to adjusted positions extending into said casing and having its inner end pivoted to said gear, a block extending outwardly from said casing and formed with a passage through which said lever passes, the block being formed with slots at opposite sides of the passage extending radially of the gear and the shaft, a fulcrum pin for said lever passing through the lever with end portions projecting from opposite sides thereof and slidably engaged in said slots whereby the pin may shift longitudinally in the slots as the lever is swung to move the gear along the shaft, a rack formed with a longitudinally extending slot through which said lever passes and having seats arranged in an arcuate path and spaced from each other longitudinally of the rack, and a latch for releasably holding the lever in an adjusted position consisting of a tube passing through the lever within the slot of the bracket, latching balls in end portions of the tube, and a spring in the tube between the balls urging the balls outwardly for engaging in the seats and releasably holding the lever in adjusted position.

OTTAVIO ZANCAN.